June 2, 1925.
J. N. GUERTIN
1,539,899
CHICKEN BROODER
Filed May 22, 1923
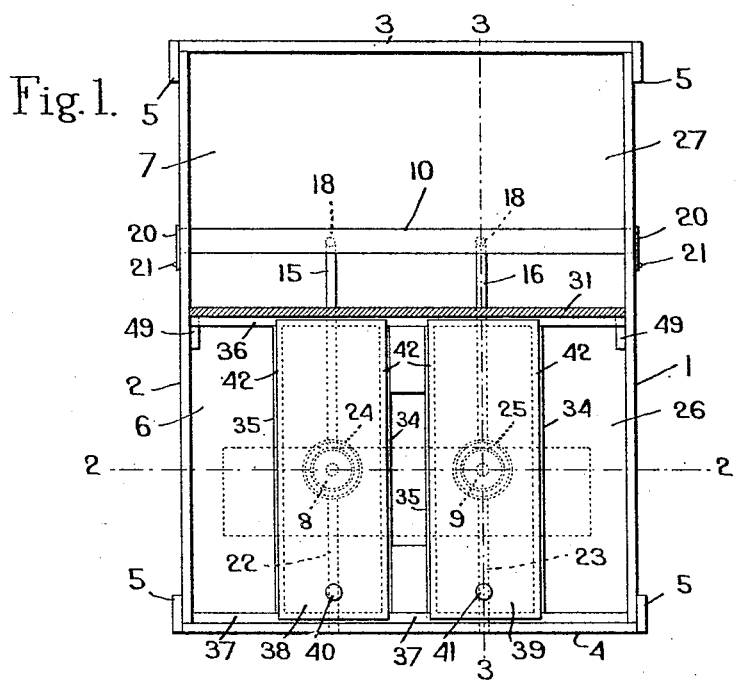
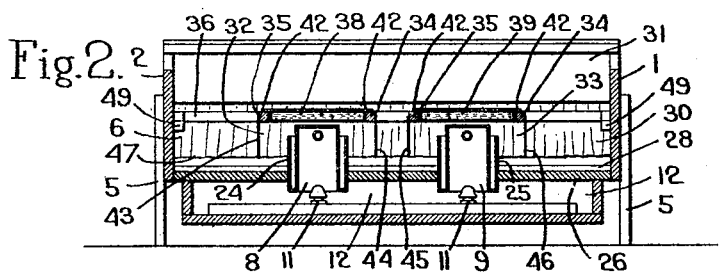
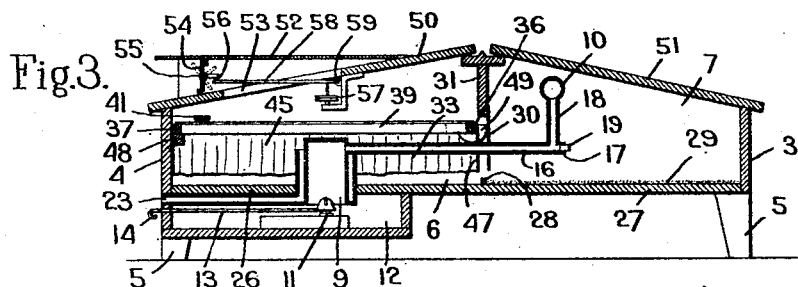
Inventor.
John N. Guertin
by Heard Smith & Tennant.
Attys.

Patented June 2, 1925.

1,539,899

UNITED STATES PATENT OFFICE.

JOHN N. GUERTIN, OF SOUTH WEYMOUTH, MASSACHUSETTS.

CHICKEN BROODER.

Application filed May 22, 1923. Serial No. 640,647.

*To all whom it may concern:*

Be it known that I, JOHN N. GUERTIN, a citizen of the United States, and resident of South Weymouth, county of Norfolk, State of Massachusetts, have invented an Improvement in Chicken Brooders, of which the following description, in connection with the accompanying drawing, is a specification, like characters on the drawing representing like parts.

This invention relates to a chick brooder and the general object thereof is to improve generally the construction of brooders so that more chicks can be housed and brought to maturity in a brooder of small size.

More specifically the invention has for its object to provide an improved arrangement for heating the brooder which is constructed to secure a more even distribution of heat than is possible with many brooders and it is also constructed so that the waste heat from the heaters that heat the hovers may be utilized to heat the scratch pen.

Other objects of the invention will be more fully hereinafter set forth.

In order to give an understanding of the invention I have illustrated in the drawings a selected embodiment thereof which will now be described, after which the novel features will be pointed out in the appended claims.

In the drawings:

Fig. 1 is a plan view of the inside of the brooder;

Fig. 2 is a section on line 2—2, Fig. 1;

Fig. 3 is a section through the brooder on line 3—3, Fig. 1.

As illustrated herein the brooder which forms the subject matter of the present invention comprises the usual sides 1 and 2 and ends 3 and 4 supported on legs 5. The brooder is divided into the brooding chamber 6 and a scratch pen 7. A plurality of heaters 8 and 9 are placed in spaced relation in the brooding chamber and waste heat from the heaters is conveyed by means of pipes to a heating element 10 in the scratch pen by means of which the scratch pen is heated. The heaters are preferably metallic domes supported in some suitable manner above lamps 11. The lamps are situated in a chamber 12 below the floor of the brooder and the size of the flame is controlled by a rod 13, which extends through the end of the brooder and terminates in a handle 14 on the outside of the brooder.

Any suitable opening, not shown, may be made through the walls of the chamber 12 to permit air to get to the lamp in order that it may burn. Pipes 15 and 16 connect with the domes 8 and 9 near but below the top thereof and carry the hot gases from the domes to the heating element 10 which may conveniently be a heating drum in the form of a pipe extending entirely across the scratch pen and opening through the walls thereof to the outside of the brooder. Pipes 10 and 15 and 16 are preferably of heat conducting material so that they will pass the heat from the hot gases into the brooder. The end of each pipe 15 and 16 extends at 17 past the upright portions 18 which connect the pipes 15 and 16 with the heating element 10 and a plug 19 is put in the extended portion 17 of each pipe, which plug may be removed in order to clean the pipes 15 and 16. Dampers 20 are pivotally fastened for vertical movement at 21 to the sides 1 and 2 of the brooder adjacent the ends of the heating element 10 in order to control the flow of gases from the heaters through the pipes and out through the heating element 10. With this construction none of the gases which are generated by the lamp are permitted to escape into the inside of the brooder.

In order to permit fresh heated air to enter the brooder, pipes 22 and 23 open at one end through a wall of the brooder, and convey fresh air from the outside of the brooder to a heating space between the heating domes 8 and 9 and spaced jackets 24 and 25 which surround the domes. The jackets join the domes at the bottom to prevent any of the gases from the lamp from entering the brooder but are spaced from the domes at the top to permit the fresh heated air to escape into the brooder. It is obvious that when the domes become hot the air surrounding the domes becomes hot and passes out into the brooder drawing fresh air through the pipes 22 and 23. In the preferred form of construction the pipes 22 and 23 pass through the upper part of chamber 12 and the jackets 24 and 25 are of metal so that they will radiate heat into the brooder when they become hot.

The floor 26 of the brooding chamber and floor 27 of the scratch pen are on the same level and a wall 28 separates the brooding chamber from the scratch pen and extends to such a height that the chicks can see over it. The wall is used merely to keep the gravel 29 which covers the floor of the scratch pen from being carried into the brooding chamber. A flexible partition 30 separates the brooding chamber and the scratch pen and extends downwardly from the ridge-pole 31 toward the wall 28 to such a height that the chicks can see under it and a space is left between the wall and the partition to permit the chicks to pass between the chamber and the pen. The parts are thus constructed because when the young chicks are in the scratch pen and become cold they huddle together in a bunch to keep warm and do not go into the brooding chamber to get warm unless they can see other chicks in the brooding chamber. When the chicks are huddled in the scratch pen it is evident that the ones on the outside become chilled and are apt to die, whereas if all of them would go into the brooding chamber they would all get warm.

Hovers 32 and 33 are situated within the brooding chamber and so arranged that one hover surrounds each heater. Each hover comprises a frame having sides 34 and 35 extending parallel to the sides 1 and 2 of the brooder. These sides are fastened to ends 36 and 37 which extend across the brooding chamber parallel with the ends 3 and 4 of the brooder. Water tanks 38 and 39 having filling caps 40 and 41 are supported on the frame by means of flanges 42 extending from the tanks and resting on the frame as clearly shown in the drawings. The water tanks lie over the heaters and absorb the heat therefrom for the purpose of maintaining an even temperature within the hovers. Spaced sections of flexible material 43, 44, 45, and 46 are fastened to the frames and surround each heater with the upper ends of the flexible material closely adjacent the edges of the water tanks and the lower edges extending nearly to the floor of the chamber. The section of flexible material surrounding one heater is separated from the flexible material surrounding the adjacent heater. Another strip of flexible material 47 extends across the brooder and is fastened to the end 36 of the frame. With this construction it will be seen that there are compartments formed, which surround the heater, having the flexible material as walls and the water tanks as tops and another compartment is formed therebetween having no top. The flexible material may be anything suitable for the purpose such as heavy awning cloth or flannel. The framework which supports the water tanks and flexible material is in turn supported by means of a ledge 48 extending along the end 4 of the brooder beneath the section 37 of the frame and recessed projections 49 are fastened to the sides 1 and 2 of the brooder for pivotally supporting the ends of the section 36 of the frame. By thus supporting the frame the one who tends to the brooder may open the hover by taking hold of the end section 37 of the frame and raising it to swing the frame around the ends of section 36 which is pivotally supported by the projections 49.

The roof 50 of the brooding chamber and the roof 51 of the scratch pen are hinged to the ridge-pole 31 in any suitable manner. In order to maintain an even temperature in the brooding chamber I have provided a thermostatically-controlled ventilator therefor. A dormer roof 52 extends from the roof of the brooding chamber and opens into the brooding chamber through an opening 53. A window 55 is pivotally supported at 54 and has a projection 56 extending therefrom so that should the projection be raised the window will be opened. A thermostat 57 of the type which expands when heated is located near the top of the brooding chamber and has an arm 58 pivoted at 59 extending through the opening 53 in the roof of the chamber in order that when the brooding chamber becomes too hot the thermostat will expand to raise the arm 58 the free end of which engages with the projection 56 on the window to open the window and permit the hot air to escape from the brooding chamber. The projection is made of such a weight that it swings the window shut when the free end of the arm is withdrawn from engagement therewith. With this construction the temperature of the brooding chamber is regulated and indirectly the temperature of the hover is regulated so that should the chicks become too hot under the hover they can come from under it into the brooding chamber which is always maintained at the correct temperature.

Although a particular and preferred form of construction has been described it is obvious that modifications may be made and I desire that the invention be construed as broadly as the limitations in the claims, taken in conjunction with the prior art, may allow.

Having thus described the invention what is claimed as new and desired to be secured by Letters Patent is:

1. A brooder for chicks comprising a brooding chamber and a scratch pen, a fuel burning heater in the brooding chamber and a heating drum extending across the scratch pen to heat said pen and opening outside of the brooder, a hot gas conveying pipe communicating with said heater and extending into the scratch pen below said heating drum, and an upright pipe connecting said gas conveying pipe and heating drum whereby the hot gas from the heater is compelled to pass through a tortuous path in order to discharge from the brooder.

2. A brooder for chicks comprising a brooding chamber and a scratch pen, a fuel burning heater including a heating dome in the brooding chamber, a heating drum extending across the scratch pen to heat said pen, a hot gas conveying pipe smaller than the heating drum communicating with said heating dome below the top thereof and extending into the scratch pen below said heating drum, and an upright pipe connecting said gas conveying pipe and heating drum whereby a body of hot gas is maintained within the heating dome and the hot gas escaping therefrom is compelled to pass through a restricted and tortuous path in order to discharge from the brooder.

3. A brooder for chicks comprising a brooding chamber and a scratch pen, a plurality of fuel burning heaters in the brooding chamber, a heating pipe located in the scratch pen and extending from one side to the other thereof, both ends of said pipe being open to the atmosphere, a pipe connecting each heater to the first-named pipe and by which the products of combustion are conveyed from the heaters to said first-named pipe and thence to the atmosphere, the arrangement of heaters and pipes being such as to evenly heat both the brooding chamber and the scratch pen.

4. A brooder for chicks comprising a brooding chamber and a scratch pen, a plurality of spaced fuel burning heaters in the brooding chamber and a heating drum extending across the scratch pen to heat said pen and opening outside of the brooder, hot gas-conveying pipes communicating with each heater and extending parallel with one another into the scratch pen below said heating drum, an upright pipe connecting each gas conveying pipe to the heating drum, and a damper arranged to move vertically past the open end of the heating drum whereby a space of substantially even heat is provided between the heaters and parallel gas conveying pipes and the hot gas from the heater is compelled to pass through a tortuous path in order to discharge from the brooder and either the hot gas in the top of the heating drum or the cool gas in the bottom thereof may be discharged.

5. In a brooder for chicks the combination with a brooding chamber and a scratch pen of a plurality of spaced fuel burning heaters in the brooding chamber and parallel pipes connected to the heaters to carry the hot gases from the burners to the scratch pen to heat the scratch pen and discharge the fumes outside of the brooder whereby a space of substantially even heat is provided between the heaters and parallel pipes.

6. A brooder for chicks having a brooding chamber, a plurality of spaced heaters, a water tank for each heater, a wall of flexible material extending across the brooding chamber on each side of each heater with the upper edges closely adjacent the edges of the corresponding water tank and the lower edges extending nearly to the floor of the chamber, the two walls either side of each heater and the corresponding water tank constituting a hover, the adjacent hovers being separated from each other thereby forming a compartment between the hovers, which compartment is open at the top, and a frame removably mounted in the chamber and supporting the water tanks and flexible walls.

In testimony whereof, I have signed my name to this specification.

JOHN N. GUERTIN.